US010138398B2

(12) United States Patent
Hu et al.

(10) Patent No.: US 10,138,398 B2
(45) Date of Patent: *Nov. 27, 2018

(54) LOW APPLICATION TEMPERATURE HOT MELT ADHESIVE

(71) Applicant: HENKEL IP & HOLDING GMBH, Duesseldorf (DE)

(72) Inventors: Yuhong Hu, Belle Mead, NJ (US); Maria Xenidou, Flemington, NJ (US); Alethea Pollock-Downer, Franklin Park, NJ (US); Matthew Sharak, Franklin Park, NJ (US); Maria Cristina Barbosa DeJesus, Basking Ridge, NJ (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,903

(22) Filed: Jan. 25, 2018

(65) Prior Publication Data

US 2018/0148615 A1 May 31, 2018

Related U.S. Application Data

(60) Division of application No. 14/804,797, filed on Jul. 21, 2015, now Pat. No. 9,914,857, which is a division of application No. 14/188,167, filed on Feb. 24, 2014, now Pat. No. 9,115,299, which is a division of application No. 13/400,218, filed on Feb. 20, 2012, now Pat. No. 8,702,900, which is a continuation of application No. PCT/US2010/045954, filed on Aug. 19, 2010.

(60) Provisional application No. 61/235,551, filed on Aug. 20, 2009.

(51) Int. Cl.
| *C09J 123/08* | (2006.01) |
| *C09J 153/00* | (2006.01) |
| *C09J 123/02* | (2006.01) |
| *C09J 5/00* | (2006.01) |
| *C09J 123/14* | (2006.01) |
| *C09J 123/20* | (2006.01) |

(52) U.S. Cl.
CPC ........... *C09J 123/0815* (2013.01); *C09J 5/00* (2013.01); *C09J 123/02* (2013.01); *C09J 123/14* (2013.01); *C09J 123/20* (2013.01); *C09J 153/00* (2013.01); *C08L 2666/02* (2013.01)

(58) Field of Classification Search
CPC .. C09J 153/00; C09J 123/0815; C09J 123/20; B32B 97/12
USPC ........................................................ 156/334
See application file for complete search history.

(56) References Cited

U.S. PATENT DOCUMENTS

| 4,233,432 A | 11/1980 | Curtis, Jr. |
| 5,171,628 A | 12/1992 | Arvedson et al. |
| 5,256,717 A | 10/1993 | Stauffer et al. |
| 5,331,033 A | 7/1994 | Stauffer et al. |
| 5,397,843 A | 3/1995 | Lakshmanan et al. |
| 6,143,818 A | 11/2000 | Wang et al. |
| 6,582,829 B1 | 6/2003 | Quinn et al. |
| 6,657,000 B1 | 12/2003 | De Keyzer et al. |
| 6,833,404 B2 | 12/2004 | Quinn et al. |
| 8,076,422 B2 | 12/2011 | Heemann et al. |
| 8,702,900 B2 * | 4/2014 | Hu .......................... C09J 123/02 156/334 |
| 9,115,299 B2 * | 8/2015 | Hu .......................... C09J 123/02 |
| 2002/0019507 A1 | 2/2002 | Karandinos et al. |
| 2005/0014891 A1 | 1/2005 | Quinn |
| 2007/0135563 A1 * | 6/2007 | Simmons ................ C08L 23/04 524/570 |
| 2007/0155900 A1 | 7/2007 | Chang et al. |
| 2007/0187032 A1 | 8/2007 | Wang |
| 2008/0076860 A1 | 3/2008 | Ahmed et al. |

FOREIGN PATENT DOCUMENTS

| JP | H08503722 A | 4/1996 |
| JP | 2000507283 A | 6/2000 |
| JP | 2003503553 A | 1/2003 |
| JP | 2006503162 A | 1/2006 |
| JP | 2007138170 A | 6/2007 |
| WO | 9410256 A1 | 5/1994 |
| WO | 9709393 A1 | 3/1997 |
| WO | 9733921 A1 | 9/1997 |
| WO | 0100257 A1 | 1/2001 |
| WO | 2004035705 A2 | 4/2004 |

OTHER PUBLICATIONS

Eastotac Hydrocarbon Resins Brochure by the Eastman Company (Aug. 1992).
Specialty Polymers for Adhesives and Sealants by the Exxon Chemical Company (Oct. 1990).
Litz, R.J., Developments in Ethylene-Based Hot Melt Adhesives, Adhesives Age 17(8):35-38 (1974).
Clark, T., Bookbinding with Adhesives (3rd ed. McGraw-Hill, UK 1994), p. 1.
Alger, Mark S.M., Polymer Science Dictionary (Elsevier Applied Science, New York 1989), p. 115.
Lee, S.M., Dictionary of Composite Materials Technology (Technomic Publishing Company, Inc., 1989) p. 43.
Young, R.J. & Lovell, P.A., Introduction to Polymers (2nd ed., Chapman & Hall, New York 1991), pp. 10-11, 292.
Handbook of Adhesives (ed. Irving Skeist, Van Nostrand Reinhold Co. 1977), pp. 495-498.
Kraus et al., Tack and Viscoelasticity of Block Copolymer Based Adhesives, J. Adhesion 10:221-36 (1979).

(Continued)

Primary Examiner — Deve E Valdez
(74) Attorney, Agent, or Firm — Sun Hee Lehmann

(57) ABSTRACT

The invention relates to a low application temperature hot melt adhesive. More specifically, the low application temperature hot melt adhesive comprises olefin copolymers with an average Melt Index greater than 5 but less than about 35 g/10 minutes at 190° C. The adhesive is particularly useful in the construction of nonwoven articles.

14 Claims, No Drawings

(56) References Cited

OTHER PUBLICATIONS

Eastman Chemical Brochure titled "World of Eastman Chemicals" dated Jan. 1989, Publication No. P-160F.
Eastman AQ Branched Polyesters Brochure dated Sep. 1997, Publication No. WA-62B.
Eastman Chemical Sales Brochure dated Feb. 1993, Publication No. WA-21.
Exxon Chemical Sales Brochure dated Mar. 1994.
Eastman Chemical Eastotac Hydrocarbon Resins dated Nov. 1994, Publication WA-3C.
Exxon Chemical Escorez Tackifiers Brochure dated Apr. 1992.

\* cited by examiner

LOW APPLICATION TEMPERATURE HOT MELT ADHESIVE

CROSS-REFERENCE TO RELATED APPLICATIONS

This application is a divisional application of U.S. patent application Ser. No. 14/804,797 filed Jul. 21, 2015, which is a divisional of U.S. patent application Ser. No. 14/188,167 filed Feb. 24, 2014, which is a divisional application of U.S. patent application Ser. No. 13/400,218 filed Feb. 20, 2012, which is a continuation of International Application No. PCT/US2010/045954 filed Aug. 19, 2010, which claims the benefit of U.S. Provisional Patent Application No. 61/235,551 filed Aug. 20, 2009, the contents of all which are incorporated herein by reference.

FIELD OF THE INVENTION

The invention relates to hot melt adhesives. The adhesive is particularly useful in the construction of nonwoven articles.

BACKGROUND OF THE INVENTION

Hot melt adhesives are applied to a substrate while in its molten state and cooled to harden the adhesive layer. Such adhesives are widely used for various commercial and industrial applications such as product assembly and packaging, and have been widely used in the non-woven industry to make baby diapers and adult incontinence products. In these applications, adhesive is applied to at least one substrate such as, for example, a film substrate (e.g., polyethylene), a non-woven substrate (e.g., polyolefin), or an elastic substrate (e.g., spandex) for binding the substrate to a second similar or different substrate.

Hot melt adhesives based on styrenic block copolymers have been used commercially as base polymers for hot melt adhesives and have found wide-spread use in nonwoven construction applications, e.g., disposable absorbent articles such as diapers, feminine hygiene articles, and adult incontinence devices. These products are typically applied at temperatures above 130° C. and often above 150° C. Lowering the application temperature of adhesives used in the manufacture of such products below 120° C. would improve the thermal aging in application equipment and reduce issues with heat sensitive or lower basis weight substrates. However, in order to apply the adhesive below 120° C. using current application technology, the viscosity must be low enough to spray and extrude cleanly. To lower viscosity, lower molecular weight polymers and higher levels of diluent have been used at the expense of performance of the hot melt adhesive. These approaches result in lower mechanical strength and more importantly less resistance to flow at elevated temperature. While the use of waxes to act as diluents as well as crystalline reinforcing agents is known, this approach suffers from a reduction in the effective open time the adhesive is capable of forming adequate bonds in the laminating processes used to make disposable articles.

There is a continuing need for a hot melt adhesive that can be applied at low temperature, i.e., below about 120° C., which has adequate open time for bonding and has a high resistance to flow at elevated temperatures. Such attributes would make the adhesives particularly well-suited for use in the manufacture of disposable articles. The invention is directed to this need.

BRIEF SUMMARY OF THE INVENTION

The invention provides a low application temperature hot melt adhesive comprising an olefin copolymer, wherein the olefin copolymer has an average Melt Index greater than 5 but less than about 35 g/10 minutes at 190° C. The olefin copolymer is a block copolymer and/or a random copolymer. The formulations of the low application temperature hot melt adhesive will also comprise a tackifier and a diluent. The formulations of the low application temperature hot melt adhesive may further comprise a wax.

In another embodiment, the low application temperature hot melt adhesive comprises an olefin copolymer, wherein the olefin copolymer have an average Melt Index greater than 5 but less than about 35 g/10 minutes at 190° C., and at least one additional polymer selected from the group consisting of hydrogenated styrene block copolymers, amorphous poly-α-olefins, and olefin copolymer with an average Melt Index of greater than about 35 g/10 minutes at 190° C. The formulations of the low application temperature hot melt adhesive will also comprise a tackifier and a diluent. The low application temperature hot melt adhesive may further comprise a wax.

In a further embodiment, the low application temperature hot melt adhesive comprises at least about 5 wt % of the olefin copolymer, wherein the olefin copolymers has an average Melt Index greater than 5 but less than about 35 g/10 minutes at 190° C.; greater than zero but no more than about 50 wt % of the additional polymer, wherein the additional polymer is selected from the group consisting of hydrogenated styrene block copolymers, amorphous poly-α-olefins and olefin copolymer with an average Melt Index of greater than about 35 g/10 minutes at 190° C.; from about 40 to about 70 wt % of a tackifier; from about 1 to about 30 wt % of a diluent; from about 0.5 to about 5 wt % a wax; and from 0 to about 5 wt % of an antioxidant.

Yet in another embodiment, the low application temperature hot melt adhesive comprises at least about 5 wt % of the olefin copolymer, wherein the olefin copolymer have an average Melt Index greater than 5 but less than about 35 g/10 minutes at 190° C.; greater than zero but no more than about 8 wt % of the additional polymer, wherein the additional polymer is a hydrogenated styrene block copolymer; from about 40 to about 70 wt % of a tackifier; from 1 to about 30 wt % of a diluent; from about 0.5 to about 4 wt % a wax; and from 0 to about 5 wt % of an antioxidant.

In another embodiment, the adhesive of the invention comprises at least about 5 wt % of an olefin copolymer with an average Melt Index greater than 5 but less than about 35 g/10 minutes at 190° C.; greater than zero but no more than about 50 wt % of an amorphous poly-α-olefin; from about 40 to about 70 wt % of a tackifier; from 1 to about 30 wt % of a diluent; from about 0.5 to about 4 wt % a wax; and from 0 to about 5 wt % of an antioxidant.

In another embodiment, the adhesives of the invention comprises at least 5 wt % of an olefin copolymer with an average Melt Index greater than about 5 but less than about 35 g/10 minutes at 190° C.; greater than zero but no more than 50 wt % of an olefin copolymer with an average Melt Index of greater than about 35 g/10 minutes at 190° C.; from 40 to 70 wt % of a tackifier; from about 1 to 30 wt % of a diluent; from 0.5 to 4 wt % a wax; and from 0 to 5 wt % of an antioxidant.

In a further embodiment, the formulated low application temperature hot melt adhesive has a viscosity of below about 11,000 centipoises at 120° C.

Yet in another embodiment, the formulated low application temperature hot melt adhesive has a yield stress (12 in/min extensional rate) of more than about 7 psi but less than about 50 psi at 25° C.

In another embodiment, the formulated low application temperature hot melt adhesive has a cube flow of less than about 200% at 60° C.

In a further embodiment, the formulated low application temperature hot melt adhesive has a cross-over temperature (when G"=G') greater than about 70° C.

In another embodiment, the low application temperature hot melt adhesive comprises an olefin copolymer with an average Melt Index greater than 5 but less than about 35 g/10 minutes at 190° C.; and the adhesive has a viscosity of below about 11,000 centipoises at 120° C., a yield stress (12 in/min extensional rate) of more than about 7 psi but less than about 50 psi at 25° C., cube flow of less than about 200% at 60° C., and a cross-over temperature (when G"=G') greater than about 70° C.

In a further embodiment, the low application temperature hot melt adhesive comprise (1) an olefin copolymer with an average Melt Index greater than 5 but less than about 35 g/10 minutes at 190° C., and (2) at least one additional polymer selected from the group consisting of hydrogenated styrene block copolymers, amorphous poly-α-olefins, and olefin copolymer with an average Melt Index of greater than about 35 g/10 minutes at 190° C.; and the adhesive has a viscosity of below about 11,000 centipoises at 120° C., a yield stress (12 in/min extensional rate) of more than about 7 psi but less than about 50 psi at 25° C., cube flow of less than about 200% at 60° C., and a cross-over temperature (when G"=G') greater than about 70° C.

In a further embodiment, the low application temperature hot melt adhesive comprises (1) an olefin copolymer with an average Melt Index greater than 5 but less than about 35 g/10 minutes at 190° C., (2) at least one additional polymer selected from the group consisting of hydrogenated styrene block copolymers, amorphous poly-α-olefins, and olefin copolymer with an average Melt Index of greater than about 35 g/10 minutes at 190° C., (3) about 40 to about 70 wt % of a tackifier, (4) from about 1 to about 30 wt % of a diluent (5) from about 0.5 to about 4 wt % a wax and (6) from 0 to about 5 wt % of an antioxidant; and the adhesive has a viscosity of below about 11,000 centipoises at 120° C., a yield stress (12 in/min extensional rate) of more than about 7 psi but less than about 50 psi at 25° C., cube flow of less than about 200% at 60° C., and a cross-over temperature (when G"=G') greater than about 70° C.

A further embodiment of the invention is directed to a process for bonding a substrate to a similar or dissimilar substrate using the adhesive. The process comprises applying to at least a portion of at least a first substrate a molten hot melt adhesive, bringing a second substrate in contact with the adhesive present on the first substrate, and allowing the adhesive to solidify, whereby the first substrate is bonded to the second substrate.

Another embodiment of the invention is directed to an article manufactured using the adhesives of the invention. The adhesives are particularly advantageous when used in the construction of nonwoven absorbent articles and garments, such as diapers and the like.

DETAILED DESCRIPTION OF THE INVENTION

The invention provides the art with low application temperature hot melt adhesive that can be applied at temperatures below about 130° C., preferable below about 120° C. The adhesive of the invention comprises an olefin copolymer, wherein the olefin copolymer has an average Melt Index range from above 5 to about 35 g/10 minutes at 190° C. The olefin copolymer of the adhesive comprises of a single olefin copolymer or a mixture of olefin copolymers. The olefin copolymer is a block copolymer and/or a random copolymer. The low application temperature hot melt adhesive will also comprise a tackifier, a diluent, and a wax.

A necessary component of the adhesive is at least one olefin-based copolymer of ethylene and at least one C3 to C20 α-olefins. These olefin copolymers are produced by metallocene catalysis polymerization. The olefin copolymer is a block copolymer and/or a random copolymer. The olefin copolymer, herein, includes copolymers and terpolymers, which also may contain further monomers. The copolymers are any polymers that have 2 monomers, and terpolymers are any polymers that have 3 monomers. Typical monomers are ethylene, propylene, butene and octene. These copolymers are characterized by the fact that they have a narrow molecular weight distribution. Such polymers are known in the literature and are available from various manufacturer under the trade name Infuse (Dow Chemical), Engage (Dow Chemical), Versify (Dow Chemical), Vistamaxx (ExxonMobil), Exact (ExxonMobil), Tafmer (Mitsui Petrochemical) and LMPO (Idemitsu).

The olefin copolymers used in the low application temperature adhesive have an average Melt Index range from above 5 to about 35 g/10 minutes at 190° C. An average melt index may be calculated by the following formula:

$$MI_{AVG} = \frac{\sum_{1}^{N}[(wt_N \% N)(MI_N)]}{\sum_{1}^{N}[(wt_N \% N)]}$$

wherein, $MI_{AVG}$ is the calculated average Melt Index, $wt_N\%$ of N is the weight fraction of the N copolymer of the total adhesive composition, and $MI_N$ is the of Melt Index value of the N copolymer. The Melt Index (interchangeably used also as Melt Flow Index) $MI_N$ values are the rate of extrusion of molten polymer through a die of specified length and diameter at a specified temperature, according to ASTM standard D-1238.

The low application temperature hot melt adhesive may further comprise an additional polymer. The additional polymer may be selected from the group consisting of hydrogenated styrene block copolymers, amorphous poly-α-olefins, and olefin copolymer with an average Melt Index value greater than about 35 g/10 minutes at 190° C.

Exemplary A-B-A block copolymer such as styrene-butadiene and styrene-isoprene, and exemplary A-B1-B2-A block copolymer (wherein B1 and B2 may be the same or different monomer) such as styrene-ethylene-butene or mixtures thereof may be used as the additional polymer. Also included are the block or multi-block copolymers having the general configuration: A-B-A or A-B-A-B-A-B- wherein the polymer blocks A are non-elastomeric polymer blocks which, as homopolymers have glass transition temperatures above 20° C., while the elastomeric polymer blocks B are butadiene or isoprene or butadiene isoprene which is partially or substantially hydrogenated. Both linear and/or branched may be used in the practice of the invention. Typical branched structures contain an elastomeric portion with at least three branches that can radiate out from a central hub or can be otherwise coupled together.

The non-elastomeric blocks may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene and the like. Other non-elastomeric polymer blocks may be derived from □-olefins, alkylene oxides, acetals, urethanes, etc.

The hydrogenated styrene block copolymer is substantially saturated materials having styrene end-blocks and ethylene-butylene, ethylene-propylene, butylene-butene or isobutylene mid-blocks and having a di-block content of less than about 70%, a di-block content of preferably less than about 50% and more preferably less than about 30%. The styrene content is preferably from about 10% to about 40% by weight of the block copolymer, more preferably from about 10% to about 35% by weight and most preferably from about 10% to about 30% by weight of the block copolymer. Preferred are styrene-ethylene-propylene-styrene block copolymers and styrene-ethylene-propylene-styrene block copolymers. A non-limiting example of a styrene-ethylene-propylene-styrene block copolymers is Septon, available from Kuraray Company, Ltd, Japan. A non-limiting exaple of a styrene-ethylene-butylene-styrene block copolymer is Kraton G-1650, available from Kraton. The midblocks are preferably ethylene-butylene, ethylene-propylene or butylene-butene or isobutylene and are more preferably ethylene-butylene or ethylene-propylene. The styrene content is preferably between about 10% and about 40% by weight of the block copolymer, more preferably from about 10% to about 35% by weight, even more preferably from about 10% to about 30% by weight and most preferably from about 10% to about 25% by weight. The melt index of these block copolymers is preferably greater than about 5 g/10 min. and more preferably greater than about 10 g/10 min. Useful examples include Kraton G-1652 available from Kraton, a 100% linear SEBS block copolymer having about 29% styrene and a melt index of about 10 g/10 min. These block copolymers are useful from greater than 0% but up to about 8 wt % of the adhesive, preferably from about 1 wt % to about 6 wt % of the adhesive and more preferably from about 2 wt % to about 5 wt % of the adhesive.

Amorphous poly-α-olefin is a polymer that can include random copolymers or terpolymers of ethylene, propylene, and butene, and other substantially amorphous or semi-crystalline propylene-ethylene polymers. Suitably, the amorphous poly-α-olefin (APAO) includes between about 20% and about 80% copolymers or terpolymers and between about 20% and about 80% other substantially amorphous or semi-crystalline propylene-ethylene polymers. Alternatively the APAO includes between about 30% and about 70% copolymers or terpolymers and between about 30% and about 70% other substantially amorphous or semi-crystalline propylene-ethylene polymers. As yet another alternative, the APAO includes between about 40% and about 60% copolymers or terpolymers and between about 40% and about 60% other substantially amorphous or semi-crystalline propylene-ethylene polymers. APAO may be a 1-butene copolymer with ethylene or propylene, or a 1-butene terpolymer with ethylene and propylene, having a number-average molecular weight of from about 5,000 to about 30,000, specifically about 10,000 to about 20,000. The butene-1 copolymer should include about 20% to about 65% by weight 1-butene, or about 30% to about 55% by weight 1-butene, and a balance of the comonomer or monomer. Alternatively, the APAO may include an ethylene-propylene copolymer having up to 80% ethylene. An example of a commercially available APAO suitable for use in the invention is Rextac (Rexene LLC), Eastoflex (Eastman Corpoartion) and Vestoplast (Evonik Corporation).

The olefin copolymer with an average Melt Index value greater than about 35 g/10 minutes at 190° C. and mixtures thereof are ethylene and at least one C3 to C20 α-olefins. These olefin copolymers are also produced by metallocene catalysis polymerization. The olefin copolymer is a block copolymer and/or a random copolymer. The olefin copolymer, herein, includes copolymers and terpolymers, which also may contain further monomers. Typical monomers are ethylene, propylene, butene and octene.

These copolymers characterized are by the fact that they have a narrow molecular weight distribution. Such polymers are known in the literature and are available from various manufacturers. One suitable olefin polymer is AFFINITY from Dow Chemical.

The olefin copolymers have an average Melt Index range from above about 35 g/10 minutes at 190° C. An average melt index may be determined by the formula set above.

The adhesives of the invention will typically also comprise from about 30 to about 70 wt % of a tackifying resin, preferably from about 40 to about 70 wt %, more preferably from about 40 to about 65 wt % of a tackifier which is compatible with the olefin copolymers and the midblock of the thermoplastic elastomer. Preferred are tackifiers having a Ring and Ball softening point above about 25° C.

Suitable tackifiers include any compatible resins or mixtures thereof such as (1) natural or modified rosins such, for example, as gum rosin, wood rosin, tall oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and □-methyl styrene/terpene; (4) polyterpene resins having a softening point, as determined by ASTM method E28,58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives.

The desirability and selection of the particular tackifying agent can depend upon the specific types of olefin copolymer employed. Preferred tackifiers for use herein include polyterpenes, aliphatic resins, cycloaliphatic resins, aliphatic/aromatic, cycloaliphatic/aromatic, and natural and modified rosin esters. More preferred are aliphatic resins, cycloaliphatic resins, polyterpenes, natural and modified rosin esters and mixtures thereof. Examples include Wingtack Extra from Sartomer, Piccotac from Eastman Chemical Company, Escorez from ExxonMobil Chemical Company, Sylvagum and Sylvalite from Arizona Chemical, and Piccolyte from Ashland.

Diluent is defined, herein as an oil, plasticizer, liquid tackifier (having a Ring and Ball softening point below about 25° C.), synthetic liquid oligomer, and mixtures thereof. When present, the compositions of the invention will typically comprise the diluent in amounts of less than about 30 wt %. When the diluent is present, the adhesive will comprise at least about 1 wt %, more typically at least about 5 wt % of a diluent.

A non-limiting example of oils include paraffinic and naphthenic petroleum oil, highly refined technical grade white petroleum mineral oils such as Kaydol oil from Crompton-Witco and naphthenic petroleum oil such as Calsol 5550 from Calumet Lubricants.

A non-limiting example of a plasticizer includes polar plasticizer, solid plasticizer, liquid plasticizer (natural and synthetic), and plasticizer that is primarily aliphatic in character and is compatible with the olefin copolymers and the thermoplastic elastomer midblock. Solid plasticizer is a solid at ambient temperature, and preferably has a softening point above 60° C. Any solid plasticizer that is able to subsequently recrystalize in the adhesive is suitable. Examples include 1,4-cyclohexane dimethanol dibenzoate, Benzoflex 352, available from Genovique Specialties. A non-limiting example of a natural liquid plasticizer is vegetable oil. Synthetic liquid plasticizers include liquid polyolefins, iso-paraffins or paraffins of moderate to high molecular weight. Examples include SpectraSyn Plus 6 from ExxonMobil Chemical.

Exemplary liquid tackfiers (having a Ring and Ball softening point below about 25° C.) are liquid tackifying diluents that include polyterpenes such as Wingtack 10 available from Sartomer, and Escorez 2520 available from ExxonMobil Chemical.

The synthetic liquid oligomers are high viscosity oligomers of polybutene, polypropene, polyterpene, and etc. which are permanently in the form of a fluid. Examples include polyisoprene, available as LIR 50 from Kuraray, and Amoco's polybutenes available under the name Indopol.

Most preferred diluents are Wingtack 10 from Sartomer and synthetic liquid oligomer polybutenes such as Indopol 300 from Amoco.

The hot melt adhesive of the present invention may also comprise a wax. Petroleum based, conventional wax, natural-based wax, functionalized wax, and polyolefin copolymers may be used in the practice of the invention. The term petroleum derived wax includes both paraffin and microcrystalline waxes having melting points within the range of from about 130° F. to about 225° F. as well as synthetic waxes such a s low molecular weight polyethylene or Fisher-Tropsch waxes. Most preferred are polyethylene or Fisher-Tropsch waxes with a melting point of at least about 175° F., more preferably at least about 195° F. and greater. Non-limiting examples include Paraffin H4 wax with melting point of 205° F., available from Salsowax America, Inc. Amounts of polyethylene or Fisher-Tropsch wax necessary to achieve the desired properties will typically range from about 0.5 to about 10 wt % of a wax, preferably less than 5 wt %, and more preferably less than 4 wt % of the total composition.

The low temperature hot melt adhesive may optionally comprise additives such as antioxidants, stabilizers, pigments, and the like. These additives may be added up to 5 wt % of the total composition.

An antioxidant or stabilizer may also be included in the adhesive compositions described herein in amounts of up to about 3% by weight, more typically in amounts of about 0.5%. Among the stabilizers or antioxidants useful herein are the hindered phenols or hindered phenols in combination with a secondary antioxidant such as distearyl thiodipropionate ("DSTDP") or dilauryl thio-dipropionate ("DLTDP"). Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl) propionate; pentaerythritol tetrakis (3-lauryl thiodipropionate); n-octadecyl-3,5-di-tert-butyl-4-hydroxyphenol)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzyl-phosphonate; 2-(n-octylthio)ethyl 3,5-di-tert-butyl-4-hydroxy-benzoate; and sorbitol hexa[3-(3,5-di-tert-butyl-4-hydroxyphenyl)-propionate]. Preferred are IRGAFOS 168, a secondary antioxidant available from Ciba and IRGANOX 1010, a hindered phenol primary antioxidant available from Ciba. Other antioxidants include ETHANOX 330, a hindered phenol from Albermarle; SANTOVAR, a 2,5 ditert-amyl hydroquinone from Monsanto; and NAVAGARD P a tris (p-nonylphenyl)phosphite from Uniroyal.

Other additives conventionally used in hot melt adhesives to satisfy different properties and meet specific application requirements also may be added to the adhesive composition of this invention. Such additives include, for example, fillers, pigments, flow modifiers, dyestuffs, which may be incorporated in minor or larger amounts into the adhesive formulation, depending on the purpose.

In one embodiment, the low application temperature hot melt adhesive has a viscosity of below about 11,000 cP at 120° C., yield stress (12 in/min extensional rate) of more than about 7 psi but less than about 50 psi at 25° C., cube flow of less than about 200% at 60° C., and a cross-over temperature (when G"=G') greater than about 70° C.

In another embodiment, the low application temperature hot melt adhesive has a viscosity of below about 9,500 centipoises at 120° C., a yield stress (12 in/min extensional rate) range of from about 15 to about 45 psi at 25° C., a cube flow of less than about 100% at 60° C., and a cross-over temperature (when G"=G') greater than about 75° C.

Yet in another embodiment, the low application temperature hot melt adhesive has a viscosity of below about 8,500 centipoises at 120° C., a yield stress (12 in/min extensional rate) range of from about 16 to about 40 psi at 25° C., a cube flow of about 0% at 60° C., and a cross-over temperature (when G"=G') greater than about 80° C.

Melt viscosity is the resistance to shear in a molten state, quantified as the quotient of shear stress divided by shear rate at any point in the flowing material. The melt viscosity for the low application hot melt adhesive should be below about 11,000 cP at 120° C. to apply onto a substrate.

Yield Stress is the stress beyond which yielding occurs for a polymer. This is defined as the yield point at which a material begins to deform plastically. Prior to the yield point, the material will deform elastically and will return to its original shape when the applied stress is removed. Once the yield point is passed some fraction of the deformation will be permanent and be non-reversible. This is a useful guide to the limit to which a polymer may be stressed. An adhesive with yield stress (12 in/min extensional rate) value greater than about 7 psi but less than about 50 psi at 25° C. allows a good balance of providing cohesive strength to resist stress and unrecoverable deformation but soft enough to maintain good adhesion with the flexible substrates.

Cube flow measures the resistance to flow. The stability of bond strength of the adhesive on aging under distribution and storage temperature is related to the resistance of the adhesive to flow in the interface between substrates. Cube flow value indicates the cohesive strength or adhesive modulus at elevated temperature. A low cube flow value correlates to adhesive's resistance to over-penetrate (bleed-out) into porous substrates over time.

The cross-over temperature is the temperature at which storage modulus G' equals loss modulus G". The modulus of elasticity (G') is an indication of the stiffness of the adhesive and can be measured as is conventional in the art. Above the crossover temperature, loss modulus G" will dominate and the adhesive will start to flow. The crossover temperature in the semi-crystalline olefin adhesives correlates to the melting temperature of the crystalline domain and the strength of the crystalline hard segment. A high cross-over temperature indicates a higher melting point crystalline phase and a better overall cohesive strength at elevated temperatures. A preferred cross-over temperature of the adhesive is greater than about 70° C., more preferably greater than about 75° C., and even more preferably greater than about 80° C.

Hot melt adhesives may be prepared using techniques known in the art. Typically, the adhesive compositions are prepared by blending the components in the melt at a temperature of about 100° to 200° C. until a homogeneous blend is obtained, generally about two hours. Various methods of blending are known and any method that produces a homogeneous blend is satisfactory.

The properties of the invention make it particularly useful in nonwoven applications and, e.g., in bottle labeling or other applications involving plastic bonding or removable pressure sensitive adhesive applications.

The adhesive is applied to a substrate while in its molten state and cooled to harden the adhesive layer. The adhesive product can be applied to a substrate such as a nonwoven article by a variety of methods including coating or spraying in an amount sufficient to cause the article to adhere to another substrate such as tissue, nonwoven, or an unrelated material such as a low density polyolefin or other conventionally employed substrates. In one embodiment of the invention, a disposable absorbent product is provided. The disposable absorbent product will typically comprises (1) a liquid-permeable topsheet, (2) a liquid-impermeable backsheet, which topsheet may be attached to the backsheet, (3) an absorbent structure positioned between the topsheet and the backsheet, and (4) a hot melt adhesive having the properties described herein.

The absorbent structure will typically comprise a nonwoven fabric. A nonwoven fabric is defined as an interlocking fiber network characterized by flexibility, porosity and integrity. The individual fibers used to compose the nonwoven fabric may be synthetic, naturally occurring, or a combination of the two. The individual fibers may be mechanically, chemically or thermally bonded to each other.

Nonwovens are used commercially for a variety of applications including insulation, packaging (e.g., foods such as meat), household wipes, surgical drapes, medical dressings, and in disposable articles such as diapers, adult incontinent products and sanitary napkins. Tissue is a closely related material in which the individual fibers may or may not be chemically bonded to one another.

The adhesives of the invention may be used to adhere the nonwoven or tissue to another substrate or component. The second substrate may be another nonwoven, tissue, or an unrelated material such as, for example, polypropylene. The adhesive may be used to attach the topsheet to the backsheet. Alternatively, the adhesive may be used to adhere either the topsheet or the backsheet to other components of the disposable absorbent product, such as tissue layers, leg flaps, fastening ears, tapes, or tabs, or other components typically used to construct a disposable absorbent product that are well known to one skilled in the art.

Those skilled in the art will recognize materials suitable for use as the topsheet and backsheet.

Exemplary of materials suitable for use as the topsheet are liquid-permeable materials, such as spunbonded polypropylene or polyethylene having a basis weight of from about 10 to about 25 grams per square meter.

Backsheets often used in disposable absorbent products are generally prepared from liquid-impermeable materials which function to contain liquids, such as water, urine, menses, or blood, within the absorbent core of the disposable absorbent product and to protect bedding and/or a wears' outer garments from diluent or a plasticizer. Materials useful as a backsheet in a disposable absorbent product are generally impermeable to liquid but are permeable to vapor. Examples are liquid-impervious materials such as polyolefin films, e.g., polypropylene and polyethylene, as well as vapor-previous materials, such as microporous polyolefin films, sometimes referred to as breathable films.

A particularly desirable backsheet material is a film comprising a polyolefin polymer such as a linear low density polyethylene and a filler. As used herein a "filler" is meant to include particulates and other forms of materials which can be added to the film polymer extrusion blend and which will not chemically interfere with or adversely affect the extruded film but which are able to be uniformly dispersed throughout the film. When the film is stretched during processing, the filler generally causes a network of holes to be formed in the film. Such holes are generally small enough to prevent the passage of a liquid, but are generally large enough to allow vapor to pass through the holes. Generally the fillers will be in particulate form and usually will have somewhat of a spherical shape with average particle sizes in the range of about 0.1 to about 7 microns. Both organic and inorganic fillers may be used in the practice of the invention provided that they do not interfere with the film formation process. Examples of fillers include calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, pulp powder, wood powder, cellulose derivatives, chitin and chitin derivatives.

EXAMPLES

Sample Preparation

Adhesive samples were formulated using techniques known in the art. The components to each adhesive samples are listed in the Tables 1-3. An exemplary procedure involved placing approximately half of the total tackifier in a jacketed mixing kettle, which is equipped with rotors, and raising the temperature to a range from about 100° C. to 200° C. The precise temperature utilized depends on the softening point of the particular tackifier. When the tackifier has melted, stirring is initiated and the rest of the components are added. Mixing and heating are continued until a smooth homogeneous mass is obtained.

Components

Infuse 9817 is an olefin block copolymer having a density of 0.877 g/cc and a melt index of 15 g/10 min measured at 190° C., available from Dow Chemical.

Engage 8402 is an ethylene/1-octene copolymer having a density of 0.902 g/cc and a melt index of 30 g/10 min measured at 190° C., available from Dow Chemical.

Engage 8200 is an ethylene/1-octene copolymer having a density of 0.870 g/cc and a melt index of 5 g/10 min measured at 190° C., available from Dow Chemical.

Vistamaxx 6202 is a propylene/ethylene copolymer having a density of 0.861 g/cc and a melt index of 7.4 g/10 min measured at 190° C., available from ExxonMobil.

Kraton G 1650 is a selectively hydrogenated block copolymer having terminal polymeric blocks of styrene and a mid-block of ethylene-butene (SEBS), available from Kraton.

Rextac RT 2732 is amorphous 1-butene-propene copolymer, available from Rexene LLC.

Affinity GA1900 is an ethylene/1-octene copolymer having a density of 0.870 g/cc and a Brookfield viscosity of 8200 cps measured at 177° C., available from Dow Chemical.

Escorez 5400 is a cycloaliphatic resin with softening points of 103° C.; available from Exxon Chemical.

Regalite 1090 is a hydrogenated hydrocarbon with softening point of 88° C.; available from Eastman Chemical.

Paraffin H4 wax is a synthetic Fischer-Tropsch wax with a melting point of 96° C.; available from Sasolwax America, Inc.

Kaydol is a white mineral oil, available from Crompton-Witco.

Krystol 350 is a white mineral oil available from Petro Canada.

Calsol 5550 is a naphthenic oil, available from Calumet Lubricants.

Irganox 1010 is a hindered phenol antioxidant, available from Ciba Specialty Chemicals.

Eastotac H100 is a hydrogenated hydrocarbon resin available from Eastman Chemical Company with a softening point of 100° C.

Komotac KT100B is polyterpene resin with a softening point of 100° C., available from Guangdong KOMO Co.

Piccolyte C85 is polyterpene resin with a softening point of 85° C., available from Ashland.

Piccolyte A115 is polyterpene resin with a softening point of 115° C., available from Ashland.

Sylvagum TR90 is polyterpene resin with a softening point of 90° C., available from Arizona Chemical.

Sylvalite RE 100 XL is a pentaerythritol ester of tall oil rosin, available from Arizona Chemical with a softening point of 100° C.

Adhesive Performance Characterization

1. Viscosity of the adhesive was measured using a standard Brookfield viscometer, spindle 27, at 120° C.

2. Yield Stress was measured using a sample size of 0.125" thick, 2.5" long dogbone shaped adhesive samples with 1"×1" end tabs and a 0.5"×0.5" test area. The test area was extended on an Instron tester with pneumatic grips at a speed of 12 inches/min, and the results were recorded.

3. Cube Flow at 60° C.: Molten adhesive was poured into a release mold to form a 1" cube and allowed to condition at 25° C. for 24 hours. The cube was removed from the mold and placed on standard graph paper (1 cm squares or similar) and placed in a controlled oven at 130° F. for 24 hours. The cube was then removed from the oven and the number of squares covered by adhesive was recorded. The percent flow was calculated using the following equation.

% flow=(Final Area−Initial Area)/Initial Area

4. Cross-over Temperature (G"=G'): A Rheometrics Dynamic Mechanical Analyzer (Model RDA 700) was used to obtain the elastic (G') modulus and the loss (G") modulus versus temperature. The instrument was controlled by Rhios software version 4.3.2. Parallel plates 8 mm in diameter and separated by a gap of about 2 mm were used. The sample was loaded and then cooled to about −100° C. and the time program started. The program test increased the temperature at 5° C. intervals followed by a soak time at each temperature of 10 seconds. The convection oven containing the sample was flushed continuously with nitrogen. The frequency was maintained at 10 rad/s. The initial strain at the start of the test was 0.05% (at the outer edge of the plates). An auto-strain option in the software was used to maintain an accurately measurable torque throughout the test. The option was configured such that the maximum applied strain allowed by the software was 80%. The auto-strain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the loss modulus (G") were calculated by the software from the torque and strain data.

Adhesives were prepared with the formulation shown in Table 1A and the performance properties of the adhesives were tested as describe above. Results are shown in Table 1B.

TABLE 1A

Adhesive Formulations

| | Sample | | | | | | | | |
|---|---|---|---|---|---|---|---|---|---|
| | 1 (%) | 2 (%) | 3 (%) | 4 (%) | 5 (%) | 6 (%) | 7 (%) | 8 (%) | A (%) |
| Infuse 9817 | 13.5 | 10.0 | 12.0 | | 5.0 | 13.0 | 5.0 | | |
| Engage 8402 | | | | 15.0 | 10.0 | | 7.0 | 5.0 | |
| Engage 8200 | | | | | | | | | 12.1 |
| Vistamaxx 6202 | | | | | | | | 9.0 | |
| Kraton G 1650 | | 4.0 | | | | | | | |
| Rextac RT 2732 | | | 5.5 | | | | | | |
| Affinity GA 1900 | | | | | | | 7.0 | 5.0 | |

TABLE 1A-continued

Adhesive Formulations

| | Sample | | | | | | | | |
|---|---|---|---|---|---|---|---|---|---|
| | 1 (%) | 2 (%) | 3 (%) | 4 (%) | 5 (%) | 6 (%) | 7 (%) | 8 (%) | A (%) |
| Escorez 5400 | 61.0 | 61.5 | 57.0 | 60.0 | 57.0 | | 55.0 | 60.0 | 57.4 |
| Regalite 1090 | | | | | | 60.0 | | | |
| Paraffin H4 wax | 3.0 | 3.0 | 1.5 | 3.0 | 3.0 | | 3.0 | 3.0 | |
| Paraflint C80 | | | | | | | | | 2.0 |
| Kaydol | 22.0 | 21.0 | | | | | | | |
| Krystol 350 | | | 23.5 | 21.8 | 24.8 | | 24.8 | | |
| Calsol 5550 | | | | | | 20.0 | | 22.8 | 28.3 |
| Irganox 1010 | 0.5 | 0.5 | 0.5 | 0.2 | 0.2 | 0.2 | 0.2 | 0.2 | 0.2 |

TABLE 1B

Adhesive performance

| Sample | 1 | 2 | 3 | 4 | 5 | 6 | 7 | 8 | A |
|---|---|---|---|---|---|---|---|---|---|
| Viscosity at 120° C. (cP) | 7875 | 7875 | 6560 | 4900 | 5400 | 7975 | 4200 | 10730 | 8375 |
| Crossover Temp (° C.) | 81 | 81 | 84 | 76 | 77 | 72 | 83 | 72 | 50 |
| Yield Stress (12'/min extensional speed) (psi) | 40 | 40 | 16 | 50 | 27 | 19 | 18 | 44 | 17 |
| Cube flow % (at 60° C. for 24 hrs) | 0 | 0 | 0 | 0 | 0 | 0 | 0 | 0 | >200% |

As shown above, the adhesive samples 1-8 made with olefin copolymer that had an average melt index range above 5 and below 35, had a viscosity of below about 11,000 centipoises at 120° C., a yield stress (12 in/min extensional rate) range of from about 7 to 50 psi at 25° C., a cube flow of less than about 200% at 60° C., and a cross-over temperature (when G"=G') greater than about 70° C. Sample A, where the olefin copolymer had an average melt index of 5, fails to meet the same performance as shown in samples 1-8.

Adhesive Sample 3 was prepared with varying amounts of wax (as shown in Table 2). The performance properties (tested as describe above) of the adhesives with varying amounts of wax are shown in Table 2.

TABLE 2

Sample Adhesive Varying Wax Amounts

| Sample | 3 | 9 | 10 | 11 | B |
|---|---|---|---|---|---|
| % Paraffin H4 wax | 1.5 | 2.0 | 2.5 | 3.0 | 5.0 |
| Viscosity at 120° C. (cP) | 6560 | 7200 | 7350 | 7880 | 4900 |
| Crossover Temp (° C.) | 84 | 92 | 91 | 81 | 81 |
| Yield Stress (psi) (12'/min extensional speed) | 16 | 18 | 21 | 40 | 104 |

As shown in Table 2, adhesive samples that contain less than 5 wt % wax had a viscosity of below about 11,000 centipoises at 120° C., a yield stress (12 in/min extensional rate) range of from about 7 to 50 psi at 25° C., a cube flow of less than about 200% at 60° C., and a cross-over temperature (when G"=G') greater than about 70° C.

Adhesive Samples 12-17 were prepared with various tackifiers. The performance properties (tested as describe above) of the adhesive with various tackifiers are shown in Table 3.

TABLE 3A

Sample Adhesive With Various Tackifiers

| Sample | 12 | 13 | 14 | 15 | 16 | 17 |
|---|---|---|---|---|---|---|
| Escorez 5400 | 54 | | | | | |
| Komotac KT100B | | 54 | | | | 43.5 |
| Piccolyte C85 | | | 61.5 | | | |
| Piccolyte A115 | | | | 48 | | |
| Sylvagum TR90 | | | | | 61.5 | |
| Sylvalite RE 100 XL | | | | | | 15 |
| Viscosity at 120° C. (cP) | 7350 | 5262 | 7087 | 6125 | 7200 | 6200 |
| Crossover Temp (° C.) | 91 | 90 | 92 | 89 | 83 | 81 |
| Yield Stress (psi) (12'/min extensional speed) | 21 | 19 | 23 | 21 | 24 | 28 |

As shown in Table 3, samples formulated with natural tackifiers such as cycloaliphatic resins, polyterpene resin and rosin ester tackifiers resulted in an adhesive with a viscosity of below about 11,000 centipoises at 120° C., a yield stress (12 in/min extensional rate) range of from about 7 to 50 psi at 25° C., and a cross-over temperature (when G"=G') greater than about 70° C.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A low application temperature hot melt adhesive comprising:
   (a) at least about 5 wt % to about 25 wt % of an olefin block copolymer, wherein having an average Melt Index range of greater than 5 and less than about 35 g/10 minutes at 190° C.;
   (b) from about 40 to about 70 wt % of a tackifier;
   (c) from about 0.5 to about 5 wt % a wax;
   (d) from about 1 to about 30 wt % of a plasticizer diluent; and
   (e) from 0 to about 5 wt % of an optional component;
   wherein the adhesive has a viscosity of below about 11,000 centipoises at 120° C., a yield stress (12 in/min extensional rate) range of from about 7 to about 50 psi at 25° C., and a cross-over temperature (when $G''=G'$) greater than about 70° C.; and
   wherein the sum of the total wt % of the adhesive equals to 100.

2. The low application temperature hot melt adhesive of claim 1, further comprising up to about 50 wt % of an additional polymer, wherein the additional polymer is selected from the group consisting of hydrogenated styrene block copolymers, amorphous poly-α-olefins and olefin copolymer with an average Melt Index of greater than about 35 g/10 minutes at 190° C.

3. The low application temperature hot melt adhesive of claim 1, wherein the olefin block copolymer is an ethyelen and at least one C3 to C20 alpha-olefin comonomer.

4. The low application temperature hot melt adhesive of claim 3, wherein the alpha-olefin comonomer propylene, butene or octane.

5. The low application temperature hot melt adhesive of claim 1, wherein the tackifier is selected from polyterpenes, aliphatic resins, cycloaliphatic resins, aliphatic/aromatic, cycloaliphatic/aromatic, natural and modified rosin esters, and mixtures thereof.

6. The low application temperature hot melt adhesive of claim 1, wherein the optional component is selected from an antioxidant, a filler, a pigment, a flow modifier, a dyestuff and mixtures thereof.

7. A low application temperature hot melt adhesive comprising:
   (a) at least about 5 wt % to about 25 wt % of an olefin random copolymer, wherein having an average Melt Index range of greater than 5 and less than about 35 g/10 minutes at 190° C.;
   (b) from about 40 to about 70 wt % of a tackifier;
   (c) from about 0.5 to about 5 wt % a wax;
   (d) from about 1 to about 30 wt % of a plasticizer diluent; and
   (e) from 0 to about 5 wt % of an optional component;
   wherein the adhesive has a viscosity of below about 11,000 centipoises at 120° C., a yield stress (12 in/min extensional rate) range of from about 7 to about 50 psi at 25° C., and a cross-over temperature (when $G''=G'$) greater than about 70° C.; and
   wherein the sum of the total wt % of the adhesive equals to 100.

8. The low application temperature hot melt adhesive of claim 7, further comprising up to about 50 wt % of an additional polymer, wherein the additional polymer is selected from the group consisting of hydrogenated styrene block copolymers, amorphous poly-α-olefins and olefin copolymer with an average Melt Index of greater than about 35 g/10 minutes at 190° C.

9. The low application temperature hot melt adhesive of claim 7, wherein the olefin random copolymer is an ethylene and at least one C3 to C20 alpha-olefin comonomer.

10. The low application temperature hot melt adhesive of claim 9, wherein the alpha-olefin comonomer propylene, butene or octane.

11. The low application temperature hot melt adhesive of claim 7, wherein the tackifier is selected from polyterpenes, aliphatic resins, cycloaliphatic resins, aliphatic/aromatic, cycloaliphatic/aromatic, natural and modified rosin esters, and mixtures thereof.

12. The low application temperature hot melt adhesive of claim 7, wherein the optional component is selected from an antioxidant, a filler, a pigment, a flow modifier, a dyestuff and mixtures thereof.

13. An article comprising a substrate and the low application temperature hot melt adhesive of claim 1.

14. An article comprising a substrate and the low application temperature hot melt adhesive of claim 7.

* * * * *

UNITED STATES PATENT AND TRADEMARK OFFICE
CERTIFICATE OF CORRECTION

PATENT NO. : 10,138,398 B2  
APPLICATION NO. : 15/879903  
DATED : November 27, 2018  
INVENTOR(S) : Yuhong Hu et al.

Page 1 of 1

It is certified that error appears in the above-identified patent and that said Letters Patent is hereby corrected as shown below:

In the Specification

Column 6, Line 8, change "Corpoaration" to "Corporation".

In the Claims

Column 15, Line 32, change "ethyelen" to "ethylene".

Signed and Sealed this  
Seventh Day of April, 2020

Andrei Iancu  
*Director of the United States Patent and Trademark Office*